United States Patent [19]
Kobylinski et al.

[11] 3,725,496
[45] Apr. 3, 1973

[54] OLEFIN DISPROPORTIONATION PROCESS

[75] Inventors: Tadeusz P. Kobylinski, Cheswick; Harold E. Swift, Gibsonia, both of Pa.

[73] Assignee: Gulf Research & Development Company, Pittsburgh, Pa.

[22] Filed: Mar. 17, 1971

[21] Appl. No.: 125,439

[52] U.S. Cl. ...........................................260/683 D
[51] Int. Cl. ................................................C07c 3/62
[58] Field of Search.................................260/683 D

[56] References Cited

UNITED STATES PATENTS

| | | | |
|---|---|---|---|
| 3,579,602 | 5/1971 | Reusser | 260/683 |
| 3,444,262 | 5/1969 | Heckelsberg | 260/683 |
| 3,261,879 | 7/1966 | Banks | 260/683 |

*Primary Examiner*—Delbert E. Gantz
*Assistant Examiner*—C. E. Spresser
*Attorney*—Meyer Neishloss, Deane E. Keith and Richard C. Gaffney

[57] ABSTRACT

A process for converting, by disproportionation, an olefin, particularly an alpha-olefin, to a product containing a mixture of olefins of higher and lower carbon number than at least one of the olefins in the olefin charge, which involves contacting the olefin charge under disproportionation reaction conditions including a temperature from 15°C. to 120°C. with a catalyst composition containing molybdenum, cobalt-molybdenum, tungsten or rhenium on an alumina containing support. The catalyst is initially pretreated with an olefin having two to 10 carbon atoms at a temperature higher than the reaction temperature.

10 Claims, No Drawings

OLEFIN DISPROPORTIONATION PROCESS

This invention relates to an improved process for converting, by disproportionation, an olefin, particularly an alpha-olefin, or a mixture thereof, to a product containing a mixture of olefins of higher and lower carbon number than at least one of the olefins in the olefin charge stock, which involves contacting the olefin charge with a pretreated catalyst composition containing molybdenum, cobalt-molybdenum, tungsten or rhenium on an inert support containing alumina.

The "disproportionation" reaction involves a process wherein two molecules of olefin, the same or different, in the presence of a catalyst and under suitable reaction conditions interact in a manner such that an olefin fragment thereof reacts with another olefinic fragment to produce olefins containing combinations of such olefinic fragments. It is believed the carbon atoms of one olefinic double bond form a cyclobutane structure with the carbon atoms of a second olefinic double bond of another molecule and two new olefins are formed by simultaneous rupture of the carbon atoms of the olefinic double bonds. Thus, disproportionation as defined herein can be illustrated by the following reaction:

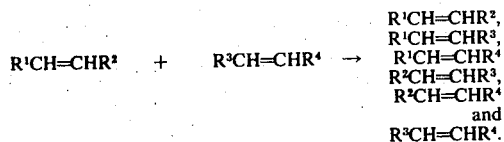

In the equation above, $R^1$, $R^2$, $R^3$ and $R^4$, the same or different, can be an alkyl group or hydrogen. By "olefinic fragment" is meant each of the RCH portions referred to above.

In prior art disproportionation reactions, a major problem resides in preventing isomerization of the olefinic bond in alpha-olefins to internal positions when the charge stock contains at least four carbon atoms, including or preventing polymerization of the olefins, including propylene. Isomerization is undesirable as it gives rise to a wide variety of products rather than simply (1) ethylene and (2) an internal olefin containing two less carbon atoms than a dimer of the olefin charge stock. In accordance with the invention, a disproportionation reaction is performed wherein at least a portion of the olefin employed has at least three carbon atoms, and isomerization and polymerization of such olefin is inhibited so that the main reaction products obtained are olefins composed of combinations of alkyl carrying fragments of the olefin charge. In the case of the preferred alpha-olefins, the main products are ethylene and an internal olefin having two less carbon atoms that the total of the carbon atoms in two molecules of the charge alpha-olefin. The inhibition of isomerization of the olefin charge stock is achieved by operating the process at low reaction temperatures using a pretreated catalyst comprising molybdenum, cobalt-molybdenum, tungsten or rhenium on a support comprising alumina. The pretreatment comprises contacting the catalyst with a monoolefinic material having two to 10 carbon atoms per molecule at a temperature higher than the reaction temperature.

The olefin charge stock employed herein comprises any olefin having from two to 30 carbon atoms per molecule so long as at least a portion of the charge has at least three carbon atoms per molecule. Preferably the charge stock contains from four to 20 carbon atoms per molecule, and most preferably the charge stock contains from four to 12 carbon atoms per molecule. The normal alpha-olefins are the preferred olefinic charge stocks in order to reduce the number of products produced. Ethylene itself cannot be used as a charge stock to the disproportionation reaction since the only product it can produce is itself. A mixture of ethylene and propylene can be employed, however, the primary disproportionation which will occur will involve propylene with propylene to produce butene-2 and ethylene.

Inert diluents can also be present in the olefinic charge stock if desired, and such diluents include, for example, paraffins. The concentration of the olefinic component in the charge stock is not critical and is suitably between 5 and 100 percent by weight and is preferably from 50 to 100 percent by weight.

Examples of suitable olefins which can be utilized as the charge stock for the subject reaction include propylene; isobutylene; butene-1; butene-2; 3-methylbutene-1; penetene-1; 2-methylbutene-2; pentene-2; hexene-1; hexene-2; hexene-3; 2-methylpentene-3; 2-ethylhexene-2; 5-cyclohexylpentene-1; octene-1; 2,4,4-trimethylpentene-2; nonene-2; decene-1; decene-2; decene-5; 5,6-dimethyloctene-2; undecene-1; dodecene-1; dodecene-2; dodecene-6; 2,2,4,6,6-pentamethylheptene-3; tetradecene-1; tetra-decene-2; tetradecene-3; tetradecene-7; eicosene-1; tetracosene-1; octacosene-1; etc. or mixtures thereof, and, optionally, included in such mixtures can be ethylene.

The disproportionation reaction is effected by contacting the olefin charge with a disproportionation catalyst pretreated in accordance with the invention under selective reaction conditions. The catalyst is composed of molybdenum, cobalt promoted molybdenum, tungsten or rhenium on a support containing alumina. The amount of molybdenum or tungsten, calculated as the metal, on the catalyst is suitably from 1 to 50 percent by weight and is preferably from 5 to 20 percent by weight based on the total catalyst. The amount of rhenium, calculated as the metal, is suitably from 0.5 to 8 percent by weight of the catalyst, is preferably from 0.5 to 5 percent and is most preferably from 1 to 3 percent by weight of the catalyst. In the case of the cobalt promoted molybdenum catalyst, the weight percent cobalt is suitably from 0.1 to 5, preferably from 0.5 to 3 percent by weight of the total catalyst.

The support which is suitable for use in the catalyst of this invention is one containing at least some alumina, usually from 0.002 to 100 weight percent alumina, and preferably the support contains from 30 to 100 weight percent alumina. The most suitable base and most widely used is substantially pure alumina, $Al_2O_3$. Known materials, such as silica, thoria, zirconia, etc., can suitably be added to these aluminas, if desired.

The catalyst support should suitably possess a high surface area. By a "high surface area" is meant a surface area in excess of about 150 square meters per gram. A suitable range of surface area is from 150 to 400 square meters per gram, but is usually from about 200 to 320 square meters per gram.

The catalyst of this invention can be prepared by any desirable procedure so long as the metals in the finally prepared catalyst are in a high valence state. Thus, the various components can be mechanically ground together or the rhenium, for example, can be placed onto an alumina catalyst base by sublimation. After the metals are mixed together or deposited on the base, they are placed into a high valence state by a suitable procedure such as by heating with or without the presence of a gas containing free molecular oxygen. A preferred method of preparation, however, involves impregnating the catalyst base using an aqueous solution of a suitable metal salt by techniques familiar to those in the catalyst preparation arts. Suitable metal salts or salt solutions include, for example, an aqueous solution of ammonium paramolybdate; and aqueous solution of cobalt nitrate; rhenium heptoxide; ammonium perrhenate, or an aqueous solution of ammonium metatungstate. A sufficient amount of a solution of the desired metal salt is used to introduce the desired amount of rhenium, molybdenum, molybdenum and cobalt, or tungsten, calculated as the metal, on the support. The remaining composition is dried, for example, in air at a temperature of about 110° to about 150°C. for about 5 to about 24 hours and is then calcined in air at a temperature of about 400° to about 600°C. over a period of about 1 to about 24 hours.

The disproportionation reaction conditions can be varied over a wide range. Thus, the olefin charge, in liquid or gaseous form, can be passed over the catalyst at (1) an LHSV (liquid volume of olefin per volume of catalyst per hour) of from about 0.2 to about 60, preferably from 0.5 to about 10, and most preferably from 1.5 to 5; or (2) a GHSV (gaseous volume of olefin per volume of catalyst per hour) of from 50 to 1,000 or more, and preferably from 400 to 700. The reaction temperature is suitably from about 15°C. to about 120°C., preferably about 75°C. to about 100°C. The pressure is not critical and is desirably low, for example, atmospheric pressure. It is preferred, however, that the pressure be sufficient to maintain the feed olefin in the reaction system in the liquid phase in order to obtain increased conversions. Thus, the pressure can be from about 0 pounds to about 600 pounds per square inch gauge, and is preferably from about 0 to about 450 pounds per square inch gauge. If the above procedure is operated in batch, the same conditions defined above can be used and contact or reaction time can be from about 10 minutes to about 240 minutes, preferably from about 30 minutes to about 120 minutes.

The reaction is preferably carried out in the absence of solvents, but if solvents are used they should not adversely affect the course of the reaction nor react with the components of the reaction system but should have a boiling point sufficiently different from that of any of the components present in the reaction system. Thus, non-polar solvents, such as hexane, cetane, decane, etc., can be used. The amount of solvent should be that amount sufficient to maintain the contents of the reaction system in the liquid phase. Thus, on a volume basis, one volume of solvent per volume of reaction mixture can be used.

If the olefin is maintained in the liquid phase, the vaporous products, for example, ethylene, are preferably removed from the reaction zone as made. At the end of the reaction period, any vaporous products still present can be flashed off. The individual components of the reaction product can then be recovered by any conventional means, such as fractionation.

It is also important that moisture in the reaction system be kept at a minimum. Thus, the catalyst should be flushed with dry nitrogen or other inert gas to remove air and moisture before the reaction begins. The flushing gas can suitably be dried by passage through a synthetic zeolite such as molecular sieves. The feed olefin and other materials added to the reaction system should similarly be dried by passage through a synthetic zeolite such as molecular sieves or otherwise.

The catalyst is then pretreated in accordance with the invention to render the catalyst more selective for the disproportionation reaction and correspondingly less selective for olefin isomerization reaction. Some catalysts, such as aluminas or silica-aluminas, are so-called single functional catalysts in that they are used to promote a single reaction such as catalytic cracking or olefin isomerization. This invention is concerned with multi-functional catalysts as described above which are useful for reactions such as disproportionation but which also promote unwanted reactions such as olefin isomerization and polymerization. The pretreatment in accordance with the invention tends to change the multi-functional catalysts described above to single functional catalysts, the single function being disproportionation.

The pretreatment comprises contacting the fresh or freshly regenerated catalyst with a monoolefinic hydrocarbon having from two to 10, preferably three to eight carbon atoms at a temperature in excess of the maximum disproportionation reaction temperature, usually a temperature from 175° to 320°C., for a time of about 30 seconds to 1 hour. While it is not certain, it is believed this pretreatment results in the absorption of the monoolefin selectively on those catalyst sites responsible for olefin isomerization and polymerization. The adsorbed olefin is then believed to form a non-acidic complex. For reasons which are not understood, the pretreatment does not result in the increased formation of coke. In fact, the pretreatment procedure results in an added benefit in that less coke is formed over a given reaction time period using a catalyst subjected to the pretreatment of this invention. For whatsoever reasons, the pretreatment method of this invention yields a catalyst which is unexpectedly improved in the selectivity of the catalyst for the disproportionation of alpha-olefins and in addition gives less total coke on catalyst.

In the pretreatment method, the pretreatment material is a monoolefin hydrocarbon having from two to 10 carbons, preferably from three to eight carbon atoms, per molecule. If the olefin to be disproportionated has from two to 10 carbon atoms, then preferably the olefin used for the pretreatment should correspond to the olefin to be disproportionated. The preferred olefins for the catalyst pretreatment method of this invention are those having from three to six carbon atoms as these olefins are particularly effective and are, in addition, more volatile and thus more easily flushed from the catalyst bed after pretreatment.

The olefins are contacted with the fresh catalyst by passage of the olefins either upflow or downflow through a bed of the catalyst. Generally, the olefins are in the vapor phase under the conditions of pretreatment.

The temperature of pretreatment is very important to achieve the desired results. The temperature is above the maximum disproportionation reaction temperature. The pretreatment temperature is suitably from about 175° to 320°C., preferably 190° to 250°C.

Any suitable gaseous hourly space velocities of olefin can be used, such as from 1 to 5,000 volumes of gaseous olefin per volume of catalyst per hour, preferably from 200 to 1,000 GHSV. The olefin is adsorbed very quickly under the temperatures of pretreatment set forth above, and effective pretreatment can be achieved in as short a time as 30 seconds to 1 minute, although times as long as 30 minutes to an hour can be used.

Before the pretreatment-olefin is contacted with the fresh catalyst, the catalyst is suitably flushed with an inert gas such as nitrogen to remove any free molecular oxygen or water which might be present. After pretreatment with an olefin, the catalyst is again preferably flushed with an inert gas such as nitrogen to remove any unreacted olefin.

After pretreatment, the disproportionation reaction is run as described above for a time until the catalyst is sufficiently deactivated to require regeneration. The regeneration is by oxidation using methods well known in the art. The catalyst can be regenerated, for example, by heating the catalyst in the presence of a gas containing free molecular oxygen (suitably from one to 100 percent free molecular oxygen, usually from two to 25 percent free molecular oxygen) for a time sufficient to remove substantially all of the carbonaceous deposits thereon at a temperature from 400° to 550°C. The catalyst is then cooled under an inert gas blanket or flushed to prepare the catalyst for the pretreatment procedure of this invention. Suitably and preferably the pretreatment occurs as the temperature of the regenerated catalyst cools to within the range set forth above for pretreatment.

The invention will be further described with reference to the following experimental work.

Typical Preparation of a Molybdenum Catalyst

An excess amount of an aqueous solution of ammonium paramolybdate was prepared and added to a 20–40 mesh alumina having a surface area of 380 square meters per gram. The catalyst was separated from the excess solution, dried in an oven at 200°C. for 6 hours and then calcined at 550°C. overnight. Analysis of the catalyst showed it contained ten percent by weight of molybdenum.

In some cases the catalyst was prepared as above except a cobalt nitrate was added. The catalyst analysis showed 2 weight percent Co and 8 weight percent molybdenum.

In all cases, unless otherwise specified, the pretreatment procedure was as follows:

the desired catalyst was charged to the reactor and heated for 2 hours at 550°C. in nitrogen;

the temperature was lowered to 200°C. in a nitrogen atmosphere and a desired olefin pretreating agent was passed downflow through the bed of catalyst at a rate of about 500 GHSV and for a time of about 7 to 15 minutes;

the flow of pretreating agent was stopped and the catalyst bed was flushed with dry nitrogen while the temperature of the reactor was lowered to the desired reaction temperature.

The desired feed olefin flow was then initiated and the products collected and analyzed.

A series of runs was made using a ten percent molybdenum on alumina catalyst for the disproportionation of 1-octene using various pretreating agents. The results of these runs are shown in Table I below.

Table I

EFFECT OF PRETREATING — 10% Mo-ALUMINA CATALYST WITH VARIOUS MATERIALS

Reaction Conditions: Temp. 93°C.; 1-Octene Flow Rate = 3 LHSV; 20 cc. of catalyst; Reaction Time = 1–4 Hrs.

Pretreating Conditions: Temp. = 200°C.; Flow Rate of Pretreating Agent = 500 GHSV (5 LHSV in case of 1-Octene); Pretreatment Time = 15 minutes

| Ex. No. | Pre-treating Agent | 1-Octene Conversion Wt. % | Tetradecene Selectivity[1] Wt. % |
|---|---|---|---|
| 1 | Isobutylene | 26.3 | 91.2 |
| 2 | 1-Butene | 48.1 | 89.8 |
| 3 | 1-Octene | 49.8 | 87.4 |
| 4 | Propylene | 67.8 | 72.0 |
| 5 | Ethylene | 70.3 | 42.7 |
| 6 | None | 90.8 | 28.2 |
| 7 | Propane | 87.3 | 29.5 |
| 8 | Butane | 88.2 | 30.1 |

[1]Wt. % Selectivity = grams tetradecene × 100/grams 1-octene converted

Referring to Table I, it can be seen that pretreatment of the catalyst with an olefin having two to eight carbon atoms substantially improves the selectivity of the catalyst for the disproportionation of 1-octene to tetradecene.

A complete analysis of a typical product (that of Example 2 above) is shown in Table II below together with an analysis of the product from Example 6 above where no pretreatment was employed.

TABLE II

DISPROPORTIONATION OF 1-OCTENE

| | |
|---|---|
| Catalyst: | Mo=10 weight percent, $Al_2O_3$=90 weight percent |
| Reaction Conditions: | Temperature 100°C. LHSV = 3 |
| Pretreatment Conditions: | 1-Butene flow rate = 500 GHSV Temperature = 200°C. Time = 15 minutes |

| | 1-Butene Pretreatment | |
|---|---|---|
| | Yess | No |
| 1-Octene Conversion, Wt. % | 48.1 | 98.8 |
| Disproportionation, Wt.% to: | | |
| $C_4$ | 0.07 | 1.30 |
| $C_5$ | 0.03 | 1.00 |
| $C_6$ | 0.09 | 2.07 |
| $C_7$ | 0.52 | 6.24 |
| $C_8$ | 1.31 | 9.28 |
| $C_9$ | 0.05 | 4.35 |
| $C_{10}$ | 0.09 | 5.74 |
| $C_{11}$ | 0.75 | 9.22 |
| $C_{12}$ | 3.23 | 14.61 |
| $C_{13}$ | 89.81 | 28.20 |
| $C_{14}$ | 1.28 | 9.38 |
| $C_{15}$ | 0.70 | 4.02 |
| $C_{16}$ | 0.42 | 1.56 |
| $C_{17}$ | 0.51 | 0.63 |
| $C_{18}$ | | |

| Higher Olefins | 1.13 | 2.38 |

EXAMPLE 9

Example 2 was repeated except the catalyst was 2 weight percent cobalt and 8 weight percent molybdenum on alumina. The weight percent conversion of 1-octene was 46.2 and the weight percent selectivity to tetradecene was 88.4.

One added benefit of the pretreatment procedure of this invention is the lowered carbon formation occurring during the disproportionation reaction. This is shown by the data in Table III below.

TABLE III

DISPROPORTIONATION OF 1-OCTENE

Reaction Conditions: 93°C.; 3 LHSV for 1-octene; reaction time for 2 hours

| Ex. No. | Catalyst | Pre-treatment | Rel. Acidity cc NH$_3$/G | Wt.% Conv. | Select. |
|---|---|---|---|---|---|
| 10 | Al$_2$O$_3$ | None | 10.3 | 1.27 | 0 | 0 |
| 6 | Mo-Al$_2$O$_3$ | None | 14.1 | 6.83 | 90.8 | 28.2 |
| 2 | Mo-Al$_2$O$_3$ | Yes[1] | 9.2 | 5.2 | 48.1 | 89.8 |

[1]Pretreatment Conditions: 1-Butene, flow rate 500 GHSV
Temp. = 200°C.
Time = 15 minutes

EXAMPLE 11

Example 2 was repeated except the olefin to be disproportionated was butene-1. The weight percent conversion and selectivity to the formation of hexenes were 11.3 percent and 88.1 percent respectively.

The effect of pretreatment time and temperature on the conversion and selectivity of 1-octene to the production of tetradecenes using the catalyst and conditions of Example 2 was also studied, and the results are shown in Table IV below.

TABLE IV

DISPROPORTIONATION OF 1-OCTENE

Reaction Conditions: 93°C.; 3 LHSV of 1-octene; atmospheric pressure; and reaction time - 6 hours.

Pretreatment with 1-butene

| Ex. No. | Temp. °C. | Time Min. | GHSV | 1-Octene Wt % Conversion | Tetradecene Wt. % Selectivity |
|---|---|---|---|---|---|
| 2 | 200 | 15 | 500 | 48.1 | 89.8 |
| 6 | | 0 | | 90.8 | 28.2 |
| 12 | 200 | 1 | 500 | 66.0 | 50.0 |
| 13 | 200 | 7.5 | 500 | 48.0 | 89.0 |
| 14 | 200 | 30 | 500 | 40.0 | 81.0 |
| 15 | 175 | 15 | 500 | 75.0 | 45.0 |
| 16 | 260 | 15 | 500 | 41.0 | 87.0 |
| 17 | 310 | 15 | 500 | 25.0 | 72.0 |

Referring to Table IV, it can be seen that the selectivity is almost doubled after only one minute of pretreatment (compare Examples 6 and 12) or after 15 minutes at even the low temperature of 93°C. (compare Examples 6 and 15).

Resort may be had to such variations and modifications as fall within the spirit of the invention and the scope of the appended claims.

We claim:

1. In a process for the disproportion of at least one monoolefin having from three to 30 carbon atoms per molecule or a mixture of at least one monoolefin having from three to 30 carbon atoms per molecule with ethylene in the presence of a catalyst comprising molybdenum, cobalt-molydenum, tungsten or rhenium on a support consisting of alumina, the improvement which comprises conducting said disproportionation reaction at a temperature from 15° to 120°C. and contacting said catalyst before said disproportionation reaction with a monoolefinic hydrocarbon having from three to 10 carbon atoms per molecule at a temperature higher than the disproportionation reaction temperature but less than 320°C. for a time of at least 30 seconds.

2. A process according to claim 1 wherein the catalyst comprises molybdenum on alumina and the olefin to be disproportionated has from three to 30 carbon atoms.

3. A process according to claim 2 wherein the monoolefinic hydrocarbon used to pretreat the catalyst has from three to eight carbon atoms and the temperature used to pretreat the catalyst is from 175° to 320°C. for a time from 30 seconds to one hour.

4. A process in accordance with claim 3 wherein the olefin used to pretreat the catalyst is 1-butene.

5. A process according to claim 4 wherein the olefin to be disproportionated is 1-octene.

6. A process for the pretreatment of a catalyst consisting of alumina and at least one metal selected from Mo, W and Re which comprises:

contacting said catalyst with a monoolefinic hydrocarbon having from three to eight carbon atoms per molecule at a temperature higher than the disproportionation reaction temperature but less than 320°C. for a time of at least 30 seconds and thereafter using said pretreated catalyst for the disproportionation of at least one monoolefin having from three to 30 carbon atoms per molecule or a mixture of at least one monoolefin having from three to 30 carbon atoms per molecule with ethylene under disproportionation reaction conditions including a temperature from 15° to 120°C.

7. A process for the disproportionation of at least one monoolefin having from three to 30 carbon atoms per molecule or a mixture of at least one monoolefin having from 3 to 30 carbon atoms per molecule with ethylene which comprises:

contacting said olefin with a pretreated catalyst comprising molybdenum, cobalt-molybdenum, tungsten or rhenium on a support consisting of alumina under disproportionation reaction conditions including a temperature from 15° to 120°C, the pretreatment for said pretreated catalyst comprising contacting said catalyst with a monoolefinic hydrocarbon having from three to 10 carbon atoms per molecule at a temperature from 175° to 320°C. for a time of at least 30 seconds;

continuing to contact said olefin to be disproportionated with said pretreated catalyst for a time sufficient to deactivate said catalyst;

regenerating said catalyst by heating in the presence of a gas containing free molecular oxygen at a temperature from 400° to 600°C.;

flushing said regenerated catalyst with an inert gas;

cooling said regenerated catalyst to a temperature from 175° to 320°C.; and repeating said pretreatment;

flushing said pretreated catalyst with an inert gas;

cooling said pretreated catalyst to a temperature from 15° to 120°C.; and repeating said disproportionation reaction.

8. A process according to claim 7 where the olefin to be disproportionated is 1-octene.

9. A process according to claim 1 wherein the olefin used to pretreat the catalyst is isobutylene.

10. A process according to claim 1 wherein the olefin used to pretreat the catalyst is 1-octene.

* * * * *